United States Patent
Chen et al.

(10) Patent No.: US 11,090,929 B2
(45) Date of Patent: Aug. 17, 2021

(54) COMPLEX IMPEDANCE DETECTION

(71) Applicant: HEWLETT-PACKARD DEVELOPMENT COMPANY, L.P., Houston, TX (US)

(72) Inventors: Chien-Hua Chen, Corvallis, OR (US); Michael W. Cumbie, Albany, OR (US); Devin Alexander Mourey, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 233 days.

(21) Appl. No.: 16/092,978

(22) PCT Filed: Jul. 21, 2016

(86) PCT No.: PCT/US2016/043311
§ 371 (c)(1),
(2) Date: Oct. 11, 2018

(87) PCT Pub. No.: WO2018/021990
PCT Pub. Date: Feb. 1, 2018

(65) Prior Publication Data
US 2020/0331259 A1    Oct. 22, 2020

(51) Int. Cl.
*B41J 2/14* (2006.01)
*B41J 2/045* (2006.01)
(Continued)

(52) U.S. Cl.
CPC .......... *B41J 2/04565* (2013.01); *B41J 2/072* (2013.01); *B41J 2/125* (2013.01); *G06F 3/1256* (2013.01)

(58) Field of Classification Search
CPC .... B41J 2/125; B41J 2/04565; B41J 2/14072; B41J 2/14153; B41J 2/14137; B41J 2/16579; B41J 2002/14354
See application file for complete search history.

(56) References Cited

U.S. PATENT DOCUMENTS

| | | |
|---|---|---|
| 5,682,184 A | 10/1997 | Stephany et al. |
| 5,966,144 A | 10/1999 | Edwards |
| (Continued) | | |

FOREIGN PATENT DOCUMENTS

| | | |
|---|---|---|
| CN | 103702835 | 4/2014 |
| CN | 104819996 | 8/2015 |
| (Continued) | | |

OTHER PUBLICATIONS

Ink Supply System, 2016, http://www.vexajet.com/index-2.html.

*Primary Examiner* — Scott A Richmond
(74) *Attorney, Agent, or Firm* — Fabian VanCott

(57) ABSTRACT

A printhead may include a nozzle, a firing chamber fluidly coupled to the nozzle, a printing fluid slot fluidly coupled to the firing chamber, and a sensor to detect a plurality of complex impedance values of a printing fluid at the printhead over a plurality of frequencies and create a printing fluid signature of the printing fluid. A method of determining at least one characteristic of a printing fluid provided to a printhead ma include, with a number of sensors, applying an alternating current at a plurality of frequencies over time to the printing fluid to receive a plurality of complex impedance values and comparing the plurality of complex impedance signals to a number of stored signals.

18 Claims, 8 Drawing Sheets

(51) Int. Cl.
*B41J 2/07* (2006.01)
*B41J 2/125* (2006.01)
*G06F 3/12* (2006.01)

(56) References Cited

U.S. PATENT DOCUMENTS

| | | | |
|---|---|---|---|
| 6,255,954 B1* | 7/2001 | Brown | B41J 2/01 |
| | | | 324/698 |
| 7,556,326 B2 | 7/2009 | Knierim et al. | |
| 9,162,457 B1 | 10/2015 | Li et al. | |
| 2004/0223021 A1 | 11/2004 | Farr et al. | |
| 2005/0001863 A1 | 1/2005 | Farr et al. | |
| 2006/0139406 A1* | 6/2006 | Tsuchiya | B05D 1/26 |
| | | | 347/54 |
| 2007/0115308 A1* | 5/2007 | Hisano | G01F 23/24 |
| | | | 347/7 |
| 2008/0055374 A1* | 3/2008 | Yahiro | B41J 2/17509 |
| | | | 347/85 |
| 2013/0278656 A1 | 10/2013 | Govyadinov et al. | |
| 2014/0132659 A1* | 5/2014 | Van Brocklin | B41J 29/377 |
| | | | 347/17 |
| 2015/0077458 A1* | 3/2015 | Osanai | B41M 5/0011 |
| | | | 347/16 |
| 2015/0273848 A1 | 10/2015 | Ge et al. | |
| 2016/0114590 A1* | 4/2016 | Arpin | G01F 23/268 |
| | | | 347/7 |
| 2017/0097307 A1* | 4/2017 | Pirkle | G01N 29/032 |

FOREIGN PATENT DOCUMENTS

| | | |
|---|---|---|
| CN | 204536249 | 8/2015 |
| EP | 1493586 | 1/2005 |
| WO | WO-2013062516 | 5/2013 |
| WO | WO-2015116121 | 8/2015 |

\* cited by examiner

COMPLEX IMPEDANCE DETECTION

BACKGROUND

Printing devices access a source of fluid from a reservoir within, for example, a printing cartridge in order to apply an image to the surface of a media. The fluid may be any type of printing fluid such as an ink. In some instances, these printing fluids may be replaced with non-original printing fluids after the original printing fluid has been consumed.

BRIEF DESCRIPTION OF THE DRAWINGS

The accompanying drawings illustrate various examples of the principles described herein and are a part of the specification. The illustrated examples are given merely for illustration, and do not limit the scope of the claims.

DETAILED DESCRIPTION

Figure 1:
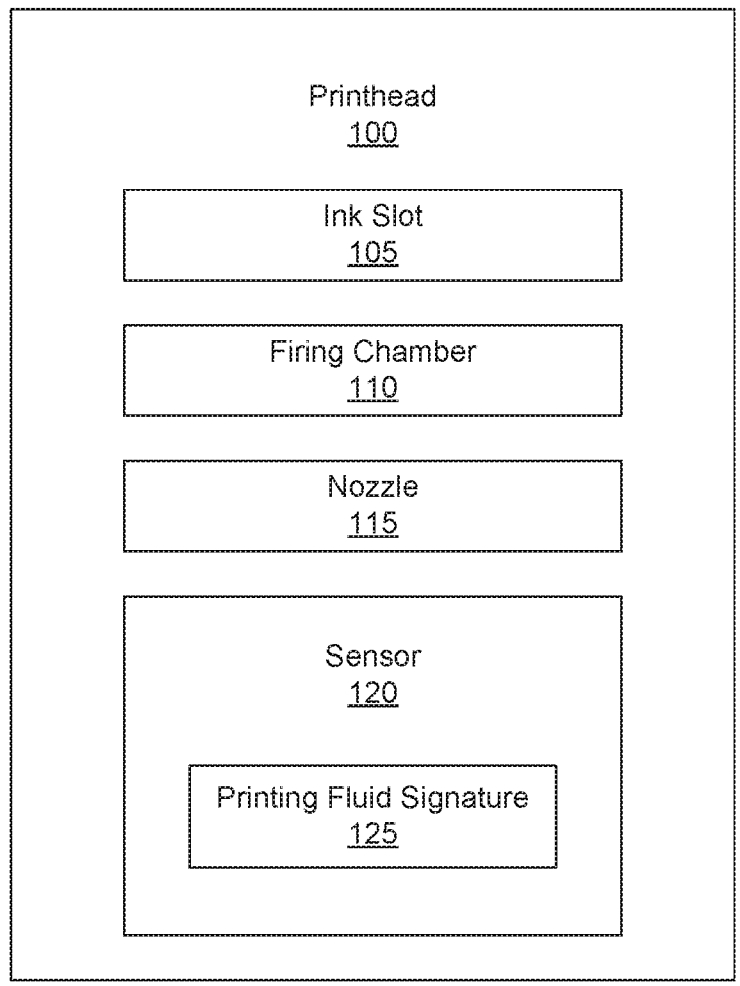
FIG. 1 is block diagram of a printhead according to an example of the principles described herein.

As described above, certain printing devices use a source of printing fluid or a reservoir that provides printing fluid to a printhead used during a printing process. The printing fluid may travel through a number of tubes and/or channels before it reaches a printhead and is ejected out onto a print media. In some instances, the printing fluid provided to the printhead may include or be devoid of certain characteristics that provide for proper functioning of the printhead or provide for an optimally appealing finished product. These characteristics may include contaminants in the printing fluid, a reduction in water within the printing fluid, an amount of pigment in the printing fluid, as well as the introduction or loss of certain other components of the printing fluid, among others. In some examples, these detected characteristics may indicate poor printing fluid quality or improper printing fluid use at the printhead. Use of some printing fluids that include these characteristics may cause damage to the printhead and/or printing device or, when used, may result in a relatively inferior image produced on the print media.

The present specification describes a printhead including a nozzle, a firing chamber fluidly coupled to the nozzle, a printing fluid slot fluidly coupled to the firing chamber, and a sensor to detect a plurality of complex impedance values of a printing fluid at the printhead over a plurality of frequencies and create a printing fluid signature of the printing fluid. The present specification also describes a method of determining at least one characteristic of a printing fluid provided to a printhead including, with a number of sensors, applying an alternating current at a plurality of frequencies over time to the printing fluid to receive a plurality of complex impedance values comparing the plurality of complex impedance signals to a number of stored signals.

The present specification also describes a printing device that includes a print cartridge including a printhead and a sensor coupled to the printhead to detect a plurality of complex impedance values of a printing fluid at the printhead.

As used in the present specification and in the appended claims, the term "printing fluid" is meant to be understood as any fluid that may be ejected from a printhead onto a print media. In an example, the printing fluid is an ink.

Additionally, as used in the present specification and in the appended claims, the term "media" or "print media" is meant to be understood as any surface onto which a printing fluid may be deposited thereon by a printhead of a printing device. In an example, the media is a sheet of paper.

Further, as used in the present specification and in the appended claims, the term "complex impedance" is meant to be understood as a value of the impedance having both a real and imaginary component. In an example, the magnitude and phase characteristics of the complex impedance is represented as:

$$Z=|Z|e^{j arg(Z)}$$

where the magnitude |Z| represents the ratio of the voltage difference amplitude to the current amplitude, while the argument $arg^{(Z)}$ gives the phase difference between voltage and current.

Further, as used in the present specification and in the appended claims, the term "a number of" or similar language is meant to be understood broadly as any positive number including 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turing to the figures, FIG. 1 is block diagram of a printhead (100) according to an example of the principles described herein. The printhead (100) may include an ink slot (105), a firing chamber (110), a nozzle (115), and a sensor (120). Each of these will now be described in more detail.

The printhead (100) may be any type of printhead that ejects a printing fluid such as ink onto print media. In an example, the printhead (100) is a piezoelectric printhead implementing a piezoelectric device to force an amount of printing fluid out of the firing chamber (110), through the nozzle (115), and onto the print media. In another example, the printhead (100) is a thermal inkjet printhead that uses a heat source to create bubbles within the printing fluid that force an amount of printing fluid out of the firing chamber (110), through the nozzle (115), and onto the print media. In either case, the firing chamber (110) of the printhead (100) may be supplied with printing fluid via an ink slot (105) fluidly coupled to a number of similar firing chambers (110).

The sensor (120) includes a pair of electrodes. The electrodes measure the complex impedance of the printing fluid as it passes through the ink slot (105), the firing chamber (110), the nozzle (115), or combinations thereof. By introducing an alternating signal at a plurality of different frequencies to the electrodes, a plurality of complex impedance values of the printing fluid in the printhead (100) may be determined and a resulting "signature" (125) of the printing fluid in the Fourier domain may be created. This signature (125) of the printing fluid may be used to compare with the signatures of other printing fluids or types of printing fluids in order to determine the characteristics of the printing fluid being used at the printhead (100). As discussed above, these characteristics may include, among others, characteristics of a contaminated printing fluid, characteristics of a relatively dryer printing fluid, as well as characteristics defining a composition of different types of printing fluids. This determination may be made as the complex impedance values of the printing fluid are sent to a processor for further analysis by the processor. A comparison of the signature (125) of the printing fluid to other signatures associated with other printing fluids may be made by the processor. This may result in a determination as to the health of the printing fluid at the printhead (100) or the presence of a printing fluid at the printhead (100) that may cause damage to parts of the printhead (100).

In an example, an associated signal may be sent to a user or printing device component when the printing device detects a certain printing fluid characteristic, such as, e.g., a contaminated printing fluid, and/or a dryer printing fluid, in order to better inform the user of the printing device regarding proper maintenance of the printing device. In an example, the associated signal may additionally or alternatively include information about the type of printing fluid detected and/or whether that printing fluid's signature (125) matches the signature of the printing fluid expected to be present at the printhead. This may result in the user being aware of which printing fluid should be used in connection with the printhead (100) in order to produce the best possible printed product. This may further result in better user satisfaction as a result of the guidance provided to the user and resulting printed products.

As mentioned above, each printing fluid may have a unique signature (125) presented in the Fourier domain by the processor associated with the printhead (100). The signature (125) may be created after the sensor (120) has measured a plurality of complex impedance values of the printing fluid over a plurality of different alternating current frequencies. Because electrical impedance is the measure of the opposition that a circuit, such as the electrodes of the sensor (120), presents to a current when a voltage is applied, the complex impedance is the complex ratio of the voltage to the alternating current at a particular frequency. During operation, the electrodes of the sensor (120) may apply decreasing or increasing frequencies of alternating current across the electrodes to receive different impedance values at these different frequencies. These impedance values may then be sent to the processor to be transformed into the Fourier domain, graphed to create the signature (125), and compared to other signatures of other types of printing fluids in a look-up table stored in a memory device associated with the processor and printhead (100).

In an example, along with detecting whether a certain printing fluid is present, the sensor (120) may further detect whether a printing fluid has lost water content due to aging of the printing fluid or leaks in the printhead (100). This may be done by comparing the signature of the printing fluid created from the complex impedance values detected by the sensor (120) with the signature (125) of the printing fluid expected to be in the printhead (100). Further, in an example, the sensor (120) may further detect whether a printing fluid includes unexpected contaminants introduced into the printing fluid during the printhead (100) manufacturing process or as a by-product of an interaction between the printing fluid and the surrounding environment.

Figure 2:
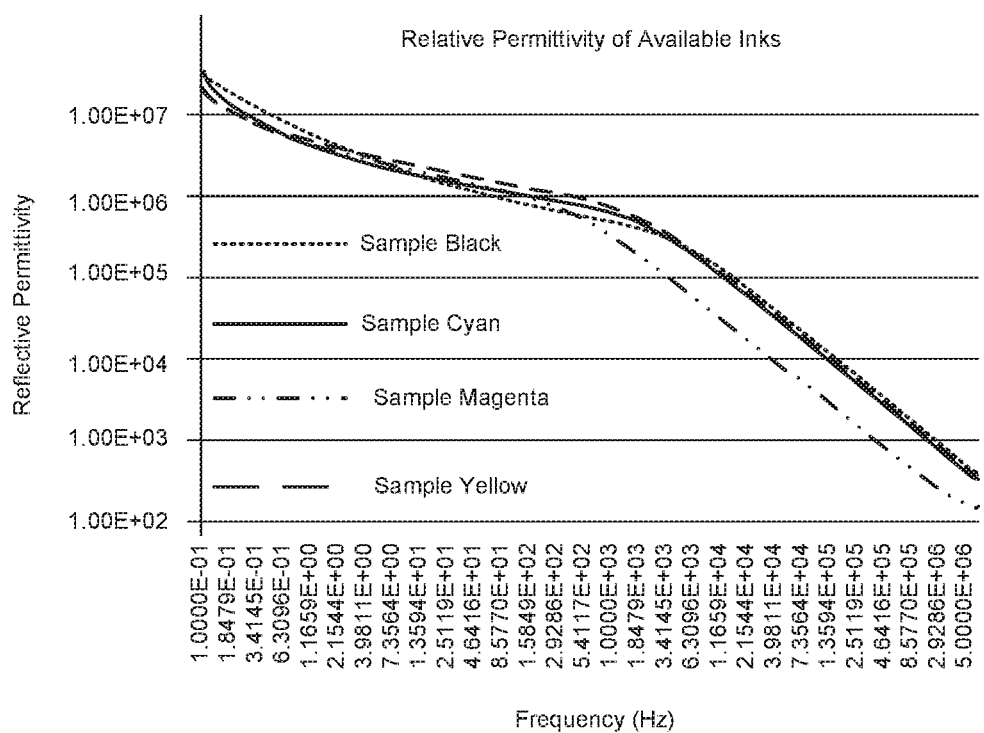
FIG. 2 is a line graph showing example complex impedance values of four different printing fluids according to an example of the principles described herein.

FIG. 2 is a line graph (200) showing example plotted complex impedance values of four different printing fluids according to an example of the principles described herein. As can be seen as the frequency of the applied AC current across the electrodes of the sensor (120) increases from 0.1 Hz to 5000000 Hz, the permittivity of each of the printing fluids generally decrease but decreases at different rates. The resulting lines indicated the specific complex impedance signature (FIG. 1, 125) of each of the individual printing fluids being monitored. These plotted lines may be generated by the processor as the processor receives the plurality of impedance values from the sensor (120) at the indicated frequencies. The plotted lines may then be compared to other plotted lines maintained in the look-up table of the memory device or other database described above to determine whether the printing fluid being used is one of the predetermined printing fluids plotted in the table.

In an example, the impedance of any capacitive element within a printing fluid may decrease with an increase in the frequency of the alternating current applied to the electrodes of the sensor. In an example, this effect may offset a permittivity change recorded by the sensor to a degree.

Figure 3:
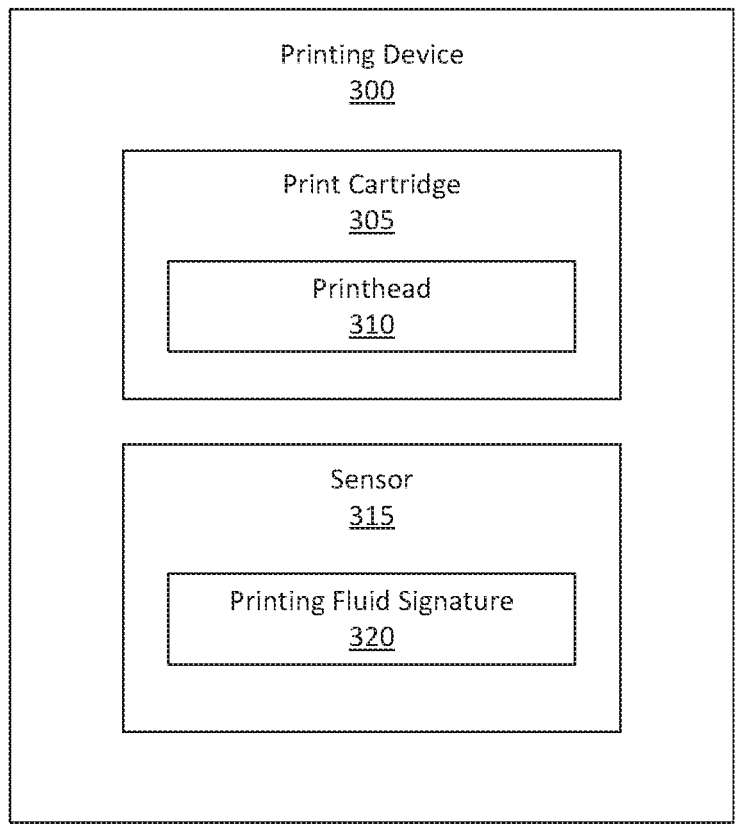
FIG. 3 is a block diagram of a printing device according to an example of the principles described herein.

FIG. 3 is a block diagram of a printing device (300) according to an example. of the principles described herein. The printing device (300) may include a print cartridge (305) including a printhead (310) and a sensor (315) coupled to the printhead. These will now be described in more detail.

The printing device (300) may be any device that includes a processor that directs the print cartridge (305) to pass across a print media in order to position the printhead (310) over the print media and eject an amount of printing fluid thereon. The printing device (300) may include any additional devices to move the print cartridge (305) as well as the print media through the printing device (300). As described above, the processor of the printing device (300) may further receive signals from the sensor (315) on the printhead (310) describing the plurality of complex impedance values at a plurality of alternating current frequencies of the printing fluid passing through the print cartridge (305) and printhead (310).

As also described above, the sensor (120) may be used to detect the complex impedance values of the printing fluid and pass those values to the processor of the printing device (300) to compare a calculated signature (320) with other signatures of other printing fluids.

Figure 4A:
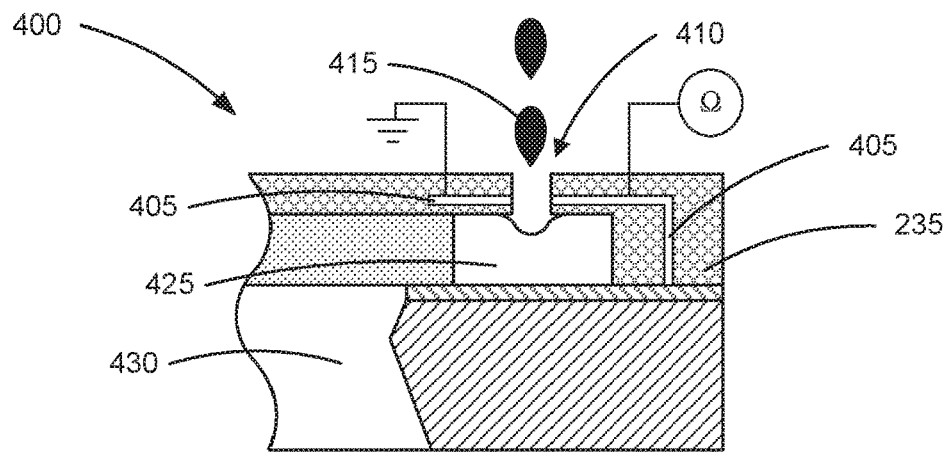
FIGS. 4A through 4C are block side cutout diagrams showing three examples of a printhead according to three examples of the principles described herein.
Figure 4B:
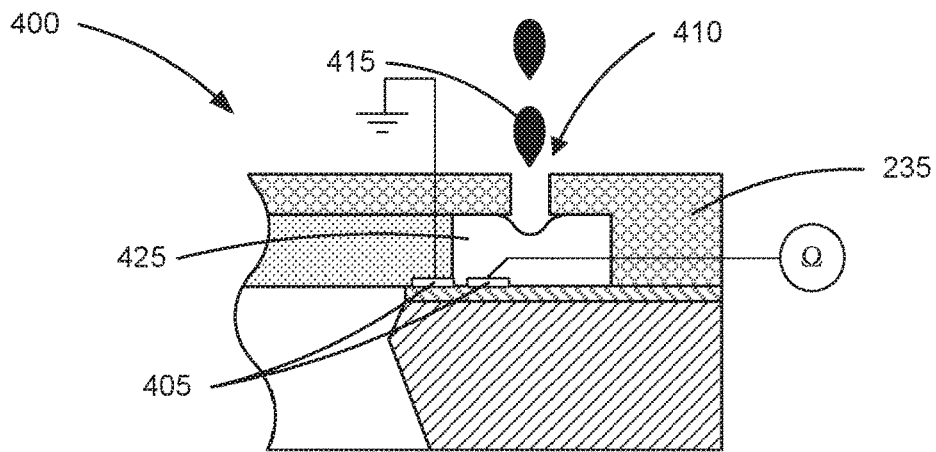
Figure 4C:
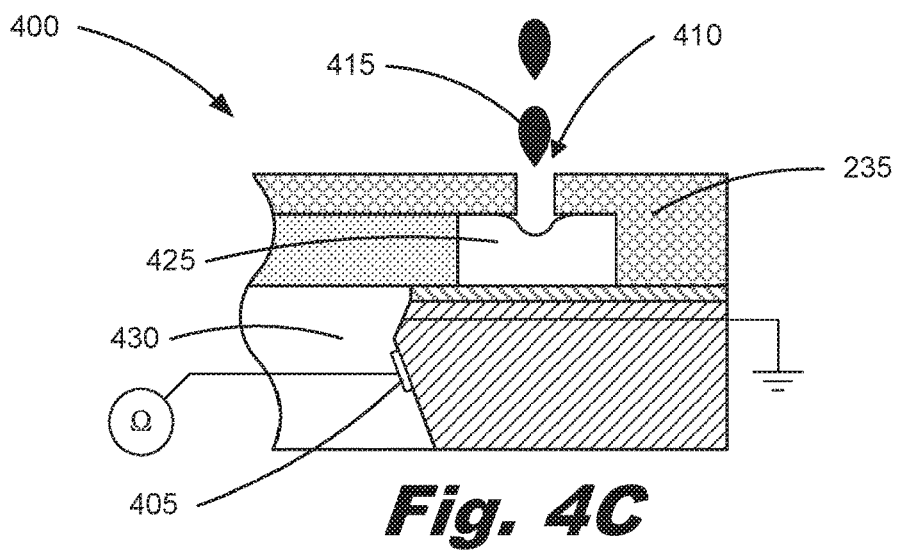

FIGS. 4A through 4C are block side cutout diagrams show three examples of a printhead (400) according to three examples of the principles described herein. FIG. 4A is a block diagram of a printhead (400) having a sensor (405) located at a nozzle (410) of the printhead (400). The sensor (405) may include, for example, two electrodes with a first electrode being connected to ground and a second electrode being connected to an alternating current as varying frequencies. An electrical conductance ($\Omega$) at each frequency may then be detected and the signal may be sent to the processor as described above.

During operation of the printhead (400) of FIG. 4A the sensor (405) may detect the conductance ($\Omega$) of the printing fluid (415) during a printing fluid (415) ejection process. When the printing fluid (415) is ejected, the complex impedance values ($\Omega$) as described above are then sent to the processor for comparison as described above. In an example, the impedance values may be detected between 0 and 20 us after the fluid ejection process has commenced and the printing fluid is pushed out of the nozzle. Between these times, the ejected printing fluid may form as a mass within the nozzle and between the electrode spanning the nozzle. In an example, the impedance values may be detected at 10 us after the fluid ejection process has commenced and the printing fluid is pushed out of the nozzle.

In an example, the sensor (405) may further detect the presence or absence of an ejected drop of printing fluid (415) when, for example, an ejection process is initiated. Where, for example, an impedance is not detected, this may be indicative of a malfunctioning printhead (400) or ejection device in the printhead (400). When such a detection is made, a signal may be sent to the processor indicating as such.

During manufacturing of the printhead (400) of FIG. 4B, the sensor (405) with its electrodes may be integrated into an SU-8 layer (235). The SU-8 layer (235) may be manufactured via, for example, a photolithography process.

FIG. 4B is a block diagram of a printhead (400) having a sensor (405) located within an ejection chamber (425) of the printhead (400). As above, the sensor (405) may include, for example, two electrodes with a first electrode being connected to ground and a second electrode being connected to an alternating current as varying frequencies. An electrical conductance (Ω) at each frequency may then be detected and the signal may be sent to the processor as described above.

During operation of the printhead (400) of FIG. 4B the sensor (405) may detect the conductance (Ω) of the printing fluid (415) whenever a printing fluid (415) is introduced into the ejection chamber (425). Whenever the printing fluid (415) is present in the ejection chamber (425), the complex impedance values (Ω) as described above are then sent to the processor for comparison as described above. In an example, the sensor (405) may detect the complex impedance of the printing fluid (415) after the printing fluid (415) has been ejected from the ejection chamber (425). In this example, the ejection chamber (425) may be refilled with printing fluid (415) after ejection of the printing fluid (415). In some instances, the ejection of the printing fluid (415) may cause a temporary vacancy within the ejection chamber (425) and the sensing by the sensor (405) may be impeded when the printing fluid (415) is not in contact with the sensor (405).

In an example, the printhead (400) may be a thermal inkjet printhead and may include circuitry within the ejection chamber (425) to heat up a resistive element. The heating of the resistive element causes the printing fluid (415) to be ejected from the nozzle (410). In an example, the electrodes of the sensor (405) may be integrated into the circuitry of the thermal inkjet printhead. This may allow for relative ease of manufacturing the printhead (400) because the sensors (405) for each ejection chamber (425) may be manufactured at or around the same time the circuitry is manufactured.

FIG. 4C is a block diagram of a printhead (400) having a sensor (405) located within a fluid feed slot (430) of the printhead (400). In this example, the sensor (405) may include a single electrode with the printing fluid (415) creating an electrical connection between the electrode and a ground. The first electrode may be connected to an alternating current as varying frequencies. An electrical conductance (Ω) at each frequency may then be detected and the signal may be sent to the processor as described above.

During operation of the printhead (400) of FIG. 4C the sensor (405) may detect the conductance (Ω) of the printing fluid (415) whenever printing fluid (415) is introduced into the fluid feed slot (430). Whenever the printing fluid (415) is present in the fluid feed slot (430), the complex impedance values (Ω) as described above are then sent to the processor for comparison as described above. Although the fluid feed slot (430) may relatively consistently have printing fluid (415) flowing therethrough, there may be circumstances where the printing fluid (415) is not present. Such a situation may occur where the entirety of the supply of printing fluid (415) has been consumed. In this case, the absence of a detected impedance may indicate to the processor that there is an issue with the printhead (400) or the supply of printing fluid (415) has been exhausted. If such a situation occurs, the processor may so indicate to a user of a printing device associated with the printhead (400) and processor that there are issues or that the supply of printing fluid (415) has been exhausted.

During a manufacturing process of the printhead (400) of FIG. 4C, the sensor (405) may be placed within the fluid feed slot (430) after cutting the fluid feed slot (430) out of the layer through which the fluid feed slot (430) is made. Although the manufacturing processes described above, present examples of where and how the sensor (405) may be added to the printhead (400), there are meant only as examples. Consequently, the present specification contemplates any number of other methods of manufacture and sensor (405) placement without specifically being limited to the above examples.

In an example the size and shape of the electrodes forming the sensor (405) may be designed to obtain the strongest signal strength of the complex impedance measurement. In this example, the signal strength is proportional to the size of electrode and several orders of magnitude of signal strength may be increased as the surface area of the electrodes increases. In an example, the magnitude of how the surface area of the electrodes increases the signal strength of the complex impedance measurement may vary with the type, color, family, etc. of the printing fluid (415).

In an example, the distance between electrodes of each sensor (405) may be separated by a distance of 300 μm or more. In this case, less than 300 μm distance between the electrodes may risk shorting of the sensor (405) due to, for example, pigment agglomerations in the printing fluid (415).

Figure 5A:
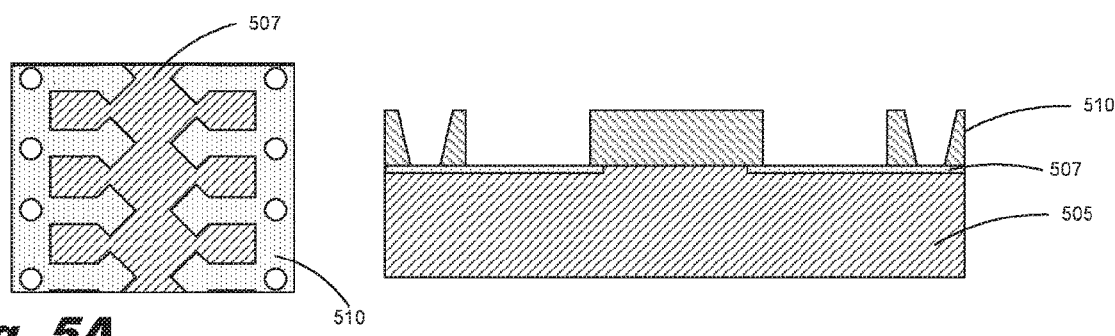
FIGS. 5A through 5F are block side cutout diagrams depicting a method of manufacturing the printhead of FIG. 4A according to one example of the principles described herein.
Figure 5B:
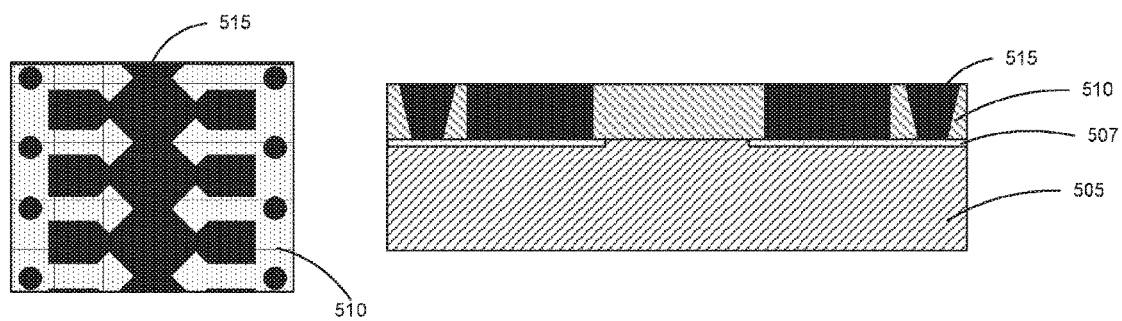
Figure 5C:
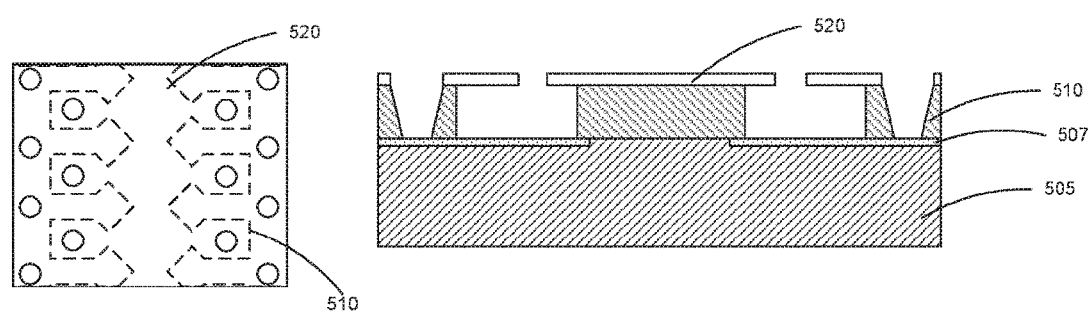
Figure 5D:
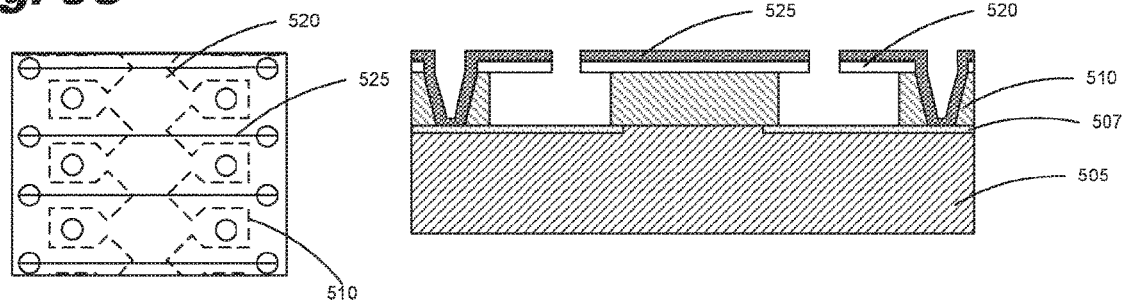
Figure 5E:
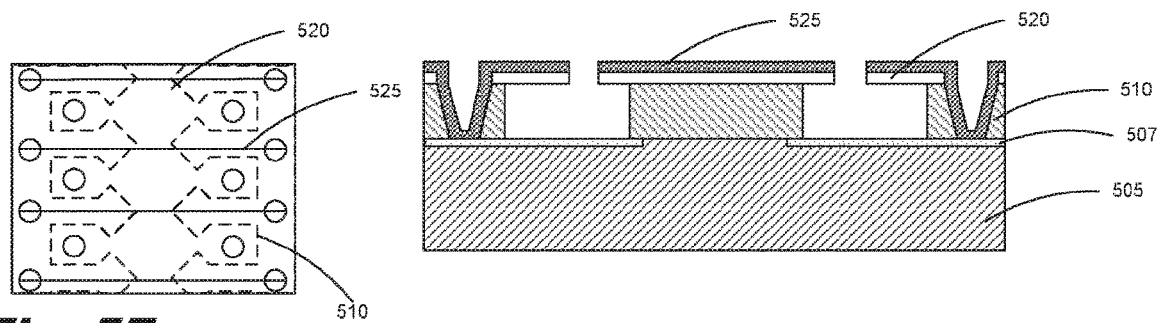
Figure 5F:
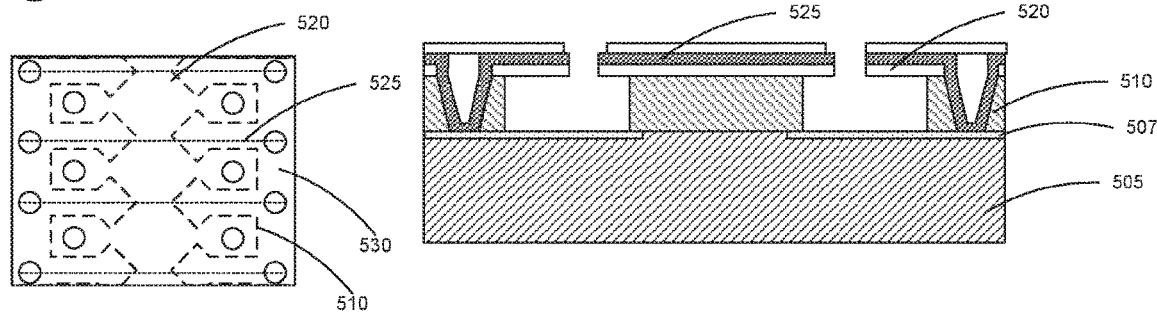

FIGS. 5A through 5F are block side cutout diagrams depicting a method of manufacturing the printhead (400) of FIG. 4A according to one example of the principles described herein. The method of manufacture may begin by placing a layer of SU-8 (510) on a wafer layer (505) including a thermal inkjet thin film layer (507) as depicted in FIG. 5A. In an example the wafer layer (505) may be made of silicon. The method may continue with spin coating a wax material (515) into the chambers created in the layer of SU-8 (510) as depicted in FIG. 5B. Next, a top hat layer (520) may be laminated over the SU-8 layer (510) and the wax material layer (515) from the SU-8 layer (510) as depicted in FIG. 5C. In an example, the wax material layer (515) may be removed during the lamination of the top hat layer (520). The method may continue with depositing metal traces (525) over the top hat layer (520). In an example, the metal traces (525) may be patterned and etched from a metallic layer placed over the top hat layer (520). In an example, the metal traces (525) may be made of platinum, palladium, gold, or some other conductive metal.

The method may continue with applying a second top hat layer (530) over the metal traces (525). The method may further include etching a backside slot through the wafer layer (505) to form the fluid feed slot (430) described above.

The above method of manufacturing is meant only as an example, and the present specification contemplates other process and methods of manufacturing the printhead (400) described above.

Figure 6:
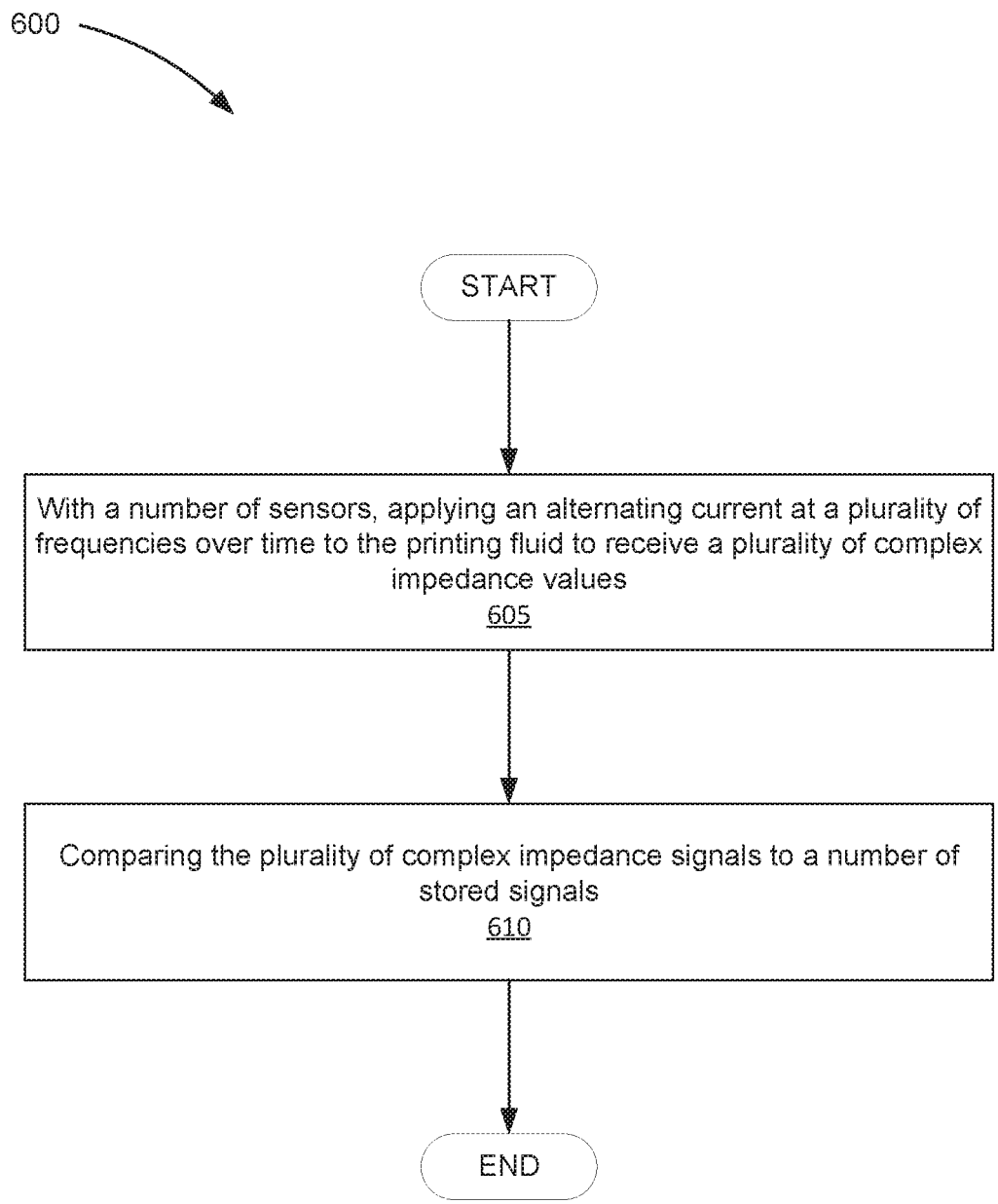
FIG. 6 is a flowchart showing a method of determining printing fluid characteristics of a printing fluid provided to a printhead according to an example of the principles described herein Throughout the drawings, identical reference numbers designate similar, but not necessarily identical, elements.

FIG. 6 is a flowchart showing a method (600) of determining at least one characteristic of a printing fluid provided to a printhead according to an example of the principles described herein. The method (600) may begin by, with a number of sensors, applying (605) an alternating current at a plurality of frequencies over time to the printing fluid to receive a plurality of complex impedance values. Again, the sensor (405) described above may be present in a nozzle (410), ejection chamber (425), and/or fluid feed slot (430) of the printhead (400) and may each send the plurality of complex impedance signals to a processor for processing as described above.

The method (600) may continue by, with a processor associated with the printhead (400), comparing (610) the plurality of complex impedance signals to a number of signals in a database. The number of complex impedance signals may be used to form a printing fluid signature (FIG. 3, 320) represented in the Fourier domain which is then compared to other signatures stored in a database.

The sensors (405) described herein may be used to detected certain characteristics of a printing fluid at a printhead (FIG. 1, 100) within a printing device (FIG. 3, 300). The electrodes of the sensor (405) are integrated in different parts of printhead such as the nozzle (410), as integrated as part of circuitry in an ejection chamber (425) of the printhead (400), and/or on walls of the fluid feed slot (430). In the examples where the electrodes of the sensor (405) are on walls of the fluid feed slot (430), a thin dielectric layer and a metal electrode layer can be deposited through shadow mask on one side of fluid feed slot (430) so that two large parallel electrodes (one on metal and the second one on silicon) made be provided in order to increase the impedance signal for the printing fluid (415) property sensing. The sensor (405) can also be fabricated as part of a thermal inkjet circuitry in order to reduce costs associated with manufacturing the printhead (400).

Printing fluid (415) property sensing can also help to detect issues such as ink health or water loss through comparison with the complex impedance of a printing fluid (415) that should be present in the printhead (400). Due to the printing fluid (415) batch variations, traces of contaminant can be introduced to printing fluid (415) in a printhead during the manufacturing process or as a by-product of the interaction between ink and the surrounding environment. Water loss can come from the aging of the ink or small leak in a print head. Each of these effects to the printing fluid (415) may be detected and relayed back to the user as a warning that provides diagnosis of the health of the printing fluid (415) and remedies to fix the issues if present.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the printing device (300) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

As described above, the present specification describes a sensor to detect certain characteristics of a printing fluid in a printhead by measuring the complex impedance values of the printing fluid over a plurality of frequencies. As discussed above, these characteristics may include, among others, characteristics of a contaminated printing fluid, characteristics of a relatively dryer printing fluid, as well as characteristics defining a composition of different types of printing fluids. The sensor may include a number of electrodes that have an alternating current applied to them. The complex impedance is measured at different frequencies of alternating current over time to develop a complex impedance "signature" of the printing fluid in the Fourier domain. Consequently, this complex impedance "signature" may be compared to the signatures of other types of printing fluids to determine if a certain printing fluid characteristic is present. For example, the signature may be compared in order to determine whether the printing fluid includes contaminants, whether the printing fluid has lost a water component due to drying of the printing fluid, whether the printing fluid at the printhead comprises certain components expected to be present in the printing fluid, and/or what type of printing fluid is present, among others. In an example, an associated signal may be sent to a user or printer component when the printing device detects a certain printing fluid characteristic in order to better inform the user of the printing device regarding proper maintenance of the printing device and/or proper printing fluid use. This may result in better user satisfaction.

The preceding description has been presented to illustrate and describe examples of the principles described. This description is not intended to be exhaustive or to limit these principles to any precise form disclosed. Many modifications and variations are possible in light of the above teaching.

What is claimed is:

1. A printhead comprising:
   a nozzle;
   a firing chamber fluidly coupled to the nozzle;
   a printing fluid slot fluidly coupled to the firing chamber; and
   a sensor to detect a plurality of complex impedance values of a printing fluid at the printhead over a plurality of alternating current frequencies; and
   a processor to receive the plurality of complex impedance values from the sensor and, based on the plurality of complex impedance values measured at different frequencies of the alternating current, create a printing fluid signature of the printing fluid in Fourier domain;
   wherein the sensor comprises two electrodes placed at the nozzle and spaced apart across an ejection opening of the nozzle.

2. The printhead of claim 1, wherein the sensor comprises an electrode located within an ejection chamber of the printhead.

3. The printhead of claim 1, wherein the sensor comprises an electrode coupled to an interior surface of the ink slot.

4. The printhead of claim 1, further comprising a database containing signatures in the Fourier domain of different printing fluids based on measuring complex impedance values over a plurality of frequencies of an alternating current.

5. The printhead of claim 4, wherein the processor is to compare the printing fluid signature with the signatures in the database to determine what printing fluid is at the printhead.

6. The printhead of claim 1, wherein the sensor is to apply an increasing or decreasing series of frequencies of alternating current to the printing fluid over time.

7. A method of determining a printing fluid provided to a printhead, comprising:
with a number of sensors, applying an alternating current at a plurality of frequencies over time to the printing fluid to receive a plurality of complex impedance values;
transforming the plurality of complex impedance values into Fourier domain to create a printing fluid signature; and
comparing the signature based on the plurality of complex impedance signals to a database of such signatures that correspond to different types of printing fluids to identify the printing fluid provided to the printhead;
wherein the plurality of complex impedance values are detected within 20 µs after a fluid ejection process has commenced and fluid is pushed out of a nozzle of the printhead.

8. The method of claim 7, further comprising using the comparison of the signature to the database to identify certain characteristics of the printing fluid.

9. The method of claim 8, wherein comparing the signature based on the complex impedance signals in Fourier domain, comprises determining whether the printing fluid has lost a water component.

10. The method of claim 7, wherein a first sensor is incorporated into an orifice layer of the printhead and comprises two electrodes spanning a first nozzle defined in the orifice layer.

11. The method of claim 7, further comprising, by comparing the signature to the database, determining whether the printing fluid at the printhead comprises contaminants.

12. The method of claim 7, further comprising applying an increasing or decreasing series of frequencies of alternating current to the printing fluid over time while generating the plurality of complex impedance values.

13. The method of claim 7, further comprising graphing the plurality of complex impedance values in the Fourier domain to create the printing fluid signature.

14. A printing device, comprising:
a printhead; and
a sensor coupled to the printhead to detect a plurality of complex impedance values of a printing fluid at the printhead;
wherein the printhead comprises a number of nozzles to eject the printing fluid, and the sensor comprises two electrodes at a nozzle of the printhead, the two electrodes disposed and being spaced apart around an opening of the nozzle.

15. The printing device of claim 14, further comprising a printing fluid complex impedance database to compare the detected complex impedance values of the printing fluid with the complex impedance values of other printing fluids.

16. The printing device of claim 14, wherein the two electrodes are separated by a distance of 300 µm or more.

17. The printing device of claim 14, further comprising:
a processor to transform the plurality of complex impedance values into Fourier domain to create a current printing fluid signature; and
a database of printing fluid signatures each based on a plurality of complex impedance values transformed into Fourier domain, the processor to compare the current signature to the signatures of the database to characterize the printing fluid provided to the printhead.

18. The printing device of claim 14, wherein the two electrodes face each other from opposite sides of the nozzle opening.

* * * * *